(12) United States Patent
Provancher (10) Patent No.: US 8,994,665 B1
(45) Date of Patent: Mar. 31, 2015

(54) SHEAR TACTILE DISPLAY SYSTEMS FOR USE IN VEHICULAR DIRECTIONAL APPLICATIONS

(75) Inventor: William R. Provancher, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 830 days.

(21) Appl. No.: 12/949,303

(22) Filed: Nov. 18, 2010

Related U.S. Application Data (60) Provisional application No. 61/262,777, filed on Nov. 19, 2009.

(51) Int. Cl.
  *G06F 3/041* (2006.01)
  *G06F 3/0488* (2013.01)

(52) U.S. Cl.
  CPC .................................. *G06F 3/0488* (2013.01)
  USPC ............................................ 345/173; 701/36

(58) Field of Classification Search
  CPC ............. G06F 3/016; G06F 2203/013; G06F 2203/015; G05G 2009/04766; G05G 9/047; G05G 1/10; B60R 2011/001; B62D 15/025; B62D 15/029
  USPC .............................. 345/156, 173–179; 701/36
  See application file for complete search history.

(56) References Cited

U.S. PATENT DOCUMENTS

| | | |
|---|---|---|
| 4,540,979 A | 9/1985 | Gerger et al. |
| 4,591,868 A | 5/1986 | Cusey |
| 5,028,093 A | 7/1991 | Nason |
| 5,184,319 A | 2/1993 | Kramer |
| 5,261,266 A | 11/1993 | Lorenze et al. |
| 5,273,384 A | 12/1993 | Dunbar |
| 5,451,924 A | 9/1995 | Massimino |
| 5,587,937 A | 12/1996 | Massie et al. |
| 5,589,828 A | 12/1996 | Armstrong |
| 5,625,576 A | 4/1997 | Massie et al. |
| 5,631,861 A | 5/1997 | Kramer |

(Continued)

FOREIGN PATENT DOCUMENTS

| | | |
|---|---|---|
| JP | 2005129004 | 5/2005 |
| KR | 20-0222674 | 5/2001 |

(Continued)

OTHER PUBLICATIONS

U.S. Appl. No. 12/699,494, Aug. 14, 2013, Notice of Allowance.

(Continued)

*Primary Examiner* — Jason Mandeville
(74) *Attorney, Agent, or Firm* — Workman Nydegger (57) ABSTRACT

A system capable of providing directional cues to a user of the vehicle comprises a vehicle component, configured to be installed within a vehicle that is adapted to be controlled by a user. A tactile display system is operably coupled to the vehicle component. The tactile display system includes: a contact pad, operable to engage a target area of a user's skin; a restraining system, operable to restrain a portion of the user's skin distal from the target area of the skin; and an actuation system, operably coupled to one of: i) the contact pad and the ii) restraining system. The actuation system is capable of moving the contact pad and the restraining system relative to one another to apply a tangential displacement or shear force across the target area of the user's skin to thereby provide tactile information to the user.

18 Claims, 3 Drawing Sheets

(56) References Cited

U.S. PATENT DOCUMENTS

| | | | |
|---|---|---|---|
| 5,694,013 A | 12/1997 | Stewart et al. |
| 5,709,219 A | 1/1998 | Chen |
| 5,721,405 A | 2/1998 | Hamada |
| 5,752,795 A | 5/1998 | D'Adamo |
| 5,765,791 A | 6/1998 | Givonetti |
| 5,767,796 A | 6/1998 | Van Roekel et al. |
| 5,786,997 A | 7/1998 | Hoyt et al. |
| 5,898,599 A | 4/1999 | Massie et al. |
| 5,982,696 A | 11/1999 | Rao |
| 6,042,555 A | 3/2000 | Kramer |
| 6,135,691 A | 10/2000 | Nadarajah et al. |
| 6,158,933 A | 12/2000 | Nicholson |
| 6,184,868 B1 | 2/2001 | Shahoian et al. |
| 6,208,328 B1 | 3/2001 | Kawachiya et al. |
| 6,236,306 B1 | 5/2001 | Liebelt |
| 6,246,391 B1 | 6/2001 | Ong |
| 6,330,837 B1 | 12/2001 | Charles |
| 6,388,655 B1 | 5/2002 | Leung |
| 6,417,638 B1 | 7/2002 | Guy et al. |
| 6,418,362 B1 | 7/2002 | St. Pierre et al. |
| 6,494,658 B1 | 12/2002 | Roy |
| 6,535,806 B2 | 3/2003 | Millsap et al. |
| 6,565,059 B1 | 5/2003 | Falconer |
| 6,691,972 B1 | 2/2004 | Oliver |
| 6,693,516 B1 | 2/2004 | Hayward |
| 6,693,622 B1 | 2/2004 | Shahoian et al. |
| 6,697,044 B2 | 2/2004 | Shahoian et al. |
| 6,703,999 B1 | 3/2004 | Iwanami et al. |
| 6,788,999 B2 | 9/2004 | Green |
| 6,793,234 B2 | 9/2004 | Carlstedt et al. |
| 6,808,350 B1 | 10/2004 | Tooman et al. |
| 6,859,819 B1 | 2/2005 | Rosenberg et al. |
| 6,930,590 B2 | 8/2005 | Ling et al. |
| 6,961,644 B2 | 11/2005 | Mercier et al. |
| 6,982,696 B1 | 1/2006 | Shahoian |
| 6,995,745 B2 | 2/2006 | Boon et al. |
| 7,044,021 B2 * | 5/2006 | Lorenz .................. 74/552 |
| 7,077,015 B2 | 7/2006 | Hayward et al. |
| 7,084,854 B1 | 8/2006 | Moore et al. |
| 7,152,331 B2 | 12/2006 | Nakamura |
| 7,196,688 B2 | 3/2007 | Schena |
| 7,209,118 B2 | 4/2007 | Shahoian et al. |
| 7,215,320 B2 | 5/2007 | Takeuchi et al. |
| 7,242,112 B2 | 7/2007 | Wolf et al. |
| 7,271,707 B2 | 9/2007 | Gonzales |
| 7,333,088 B2 | 2/2008 | Boon et al. |
| 7,339,574 B2 | 3/2008 | Kyung et al. |
| 7,450,110 B2 | 11/2008 | Shahoian et al. |
| 7,565,180 B2 | 7/2009 | Tsai |
| 7,603,214 B2 | 10/2009 | Tanaka et al. |
| 7,605,694 B2 | 10/2009 | Prost-Fin et al. |
| 7,607,087 B2 | 10/2009 | Prados |
| 7,683,735 B2 | 3/2010 | Shibahara |
| 7,692,552 B2 | 4/2010 | Harrington et al. |
| 7,710,279 B1 | 5/2010 | Fields |
| 8,004,052 B2 | 8/2011 | Vaganov |
| 8,011,234 B2 * | 9/2011 | Kandler ............ 73/117.02 |
| 8,026,798 B2 * | 9/2011 | Makinen et al. ........ 340/407.1 |
| 8,125,453 B2 | 2/2012 | Shahoian |
| 8,326,462 B1 | 12/2012 | Provancher |
| 2001/0052893 A1 | 12/2001 | Jolly et al. |
| 2002/0033795 A1 | 3/2002 | Shahoian |
| 2002/0068605 A1 | 6/2002 | Stanley |
| 2002/0145512 A1 | 10/2002 | Sleichter, III et al. |
| 2003/0016207 A1 | 1/2003 | Tremblay |
| 2004/0010346 A1 | 1/2004 | Stwart et al. |
| 2004/0025624 A1 * | 2/2004 | Kreuzer .................. 74/552 |
| 2004/0040805 A1 | 3/2004 | Bailey |
| 2004/0060807 A1 | 4/2004 | Nishimoto |
| 2004/0095369 A1 | 5/2004 | Takeuchi et al. |
| 2004/0104887 A1 | 6/2004 | Tsukamoto et al. |
| 2004/0106916 A1 | 6/2004 | Quaid et al. |
| 2004/0117084 A1 | 6/2004 | Mercier et al. |
| 2004/0129552 A1 | 7/2004 | Nakade |
| 2004/0227727 A1 | 11/2004 | Schena et al. |
| 2004/0237669 A1 | 12/2004 | Hayward et al. |
| 2005/0021190 A1 | 1/2005 | Worrell et al. |
| 2005/0052415 A1 | 3/2005 | Braun et al. |
| 2005/0073195 A1 | 4/2005 | Popilek |
| 2005/0110754 A1 | 5/2005 | Harley et al. |
| 2005/0110758 A1 | 5/2005 | Kyung et al. |
| 2005/0222830 A1 | 10/2005 | Massie |
| 2005/0231686 A1 | 10/2005 | Rathjen |
| 2006/0115347 A1 | 6/2006 | Lee |
| 2006/0115348 A1 | 6/2006 | Kramer |
| 2006/0185921 A1 | 8/2006 | Cieler et al. |
| 2006/0192760 A1 | 8/2006 | Moore et al. |
| 2006/0227065 A1 | 10/2006 | Yukawa et al. |
| 2006/0256075 A1 | 11/2006 | Anastas et al. |
| 2007/0008083 A1 | 1/2007 | Berg et al. |
| 2007/0091063 A1 | 4/2007 | Nakamura et al. |
| 2007/0100523 A1 | 5/2007 | Trachte |
| 2007/0241595 A1 | 10/2007 | Nathan et al. |
| 2007/0265077 A1 | 11/2007 | Tome et al. |
| 2007/0299580 A1 | 12/2007 | Lin et al. |
| 2008/0024284 A1 | 1/2008 | Baratoff et al. |
| 2008/0088582 A1 | 4/2008 | Prest et al. |
| 2008/0111791 A1 | 5/2008 | Nikittin |
| 2008/0120029 A1 | 5/2008 | Zelek et al. |
| 2008/0174415 A1 * | 7/2008 | Tanida et al. ............ 340/438 |
| 2008/0192002 A1 | 8/2008 | Funch et al. |
| 2008/0193260 A1 | 8/2008 | Yokokohji et al. |
| 2009/0036212 A1 | 2/2009 | Provancher |
| 2009/0096746 A1 | 4/2009 | Kruse |
| 2009/0160770 A1 | 6/2009 | Shahoian |
| 2009/0179854 A1 | 7/2009 | Weber et al. |
| 2009/0278798 A1 | 11/2009 | Kim |
| 2010/0070254 A1 | 3/2010 | Tsai |
| 2011/0032090 A1 | 2/2011 | Provancher |
| 2011/0115754 A1 | 5/2011 | Cruz-Hernandez |
| 2012/0038468 A1 | 2/2012 | Provancher |
| 2012/0122062 A1 | 5/2012 | Yang |

FOREIGN PATENT DOCUMENTS

| | | |
|---|---|---|
| WO | WO 0191100 | 11/2001 |
| WO | WO 03/012557 | 2/2003 |
| WO | WO 2006/115347 | 11/2006 |
| WO | WO 2009/018330 | 2/2009 |
| WO | WO 2009/129287 | 10/2009 |

OTHER PUBLICATIONS

International Search Report for PCT/US2011/055633 dated Mar. 27, 2012.
Written Opinion for PCT/US2011/055633 dated Mar. 27, 2012.
International Search Report for PCT/US2008/071574 dated Mar. 18, 2009.
Written Opinion for PCT/US2008/071574 dated Mar. 18, 2009.
International Search Report for PCT/US2013/032053 dated Jul. 25, 2013.
Written Opinion for PCT/US2013/032053 dated Jul. 25, 2013.
U.S. Appl. No. 13/269,948, Mar. 15, 2013, Office Action.
U.S. Appl. No. 12/402,067, Aug. 3, 2012, Notice of Allowance.
U.S. Appl. No. 12/699,494, May 16, 2013, Notice of Allowance.
U.S. Appl. No. 12/699,494, Jan. 28, 2013, Office Action.
U.S. Appl. No. 12/182,906, Mar. 29, 2011, Office Action.
U.S. Appl. No. 12/182,906, Sep. 19, 2011, Final Office Action.
U.S. Appl. No. 13/041,169, Oct. 17, 2013, Office Action.
U.S. Appl. No. 13/269,948, Sep. 27, 2013, Final Office Action.
Scheibe, R.; Moehring, M.; Froehlich, B., "Tactile Feedback at the Finger Tips for Improved direct interaction in Immersive Environments," 3D User Interfaces, 2007. 3DUI '07. IEEE Symposium on, Mar. 10-11, 2007.
Drewing et al; First Evaluation of a Novel Tactile Display Exerting Shear Force via Lateral Displacement; ACM Transactions of Applied Perception; vol. 2; Apr. 2005; pp. 118-131.
U.S. Appl. No. 12/182,906, Apr. 7, 2014, Office Action.
U.S. Appl. No. 12/182,906, Oct. 24, 2014, Final Office Action.
U.S. Appl. No. 13/041,169, Jun. 17, 2014, Final Office Action.
U.S. Appl. No. 13/269,948, Jul. 17, 2014, Office Action.

(56) References Cited

OTHER PUBLICATIONS

Abbott et al; Haptic Virtual Fixtures for Robot-Assisted Manipulation; Department of Mechanical Engineering; The Johns Hopkins University; 11 pages, Oct. 2005.
Arai et al.; Tactile Display Which Presents Shear Deformation on Human Finger; Proceedings of the 2001 IEE International Conference on Robotics & Automation; Seoul, Korea; May 21-26, 2001.
Cavusoglu et al.; Robotics for Telesurgery: Second Generation Berkely/UCSF Laparoscopic Telesurgical Workstation and Looking Towards the Future Applications; Special Issue on Medical Robotics; Jan. 2003; vol. 30, No. 1; 11 pages.
Dominquez-Garcia et al., Haptic Interface for Automotive Steer-by-Wire Systems. Massachusetts Institute of Technology, Laboratory for Electromagnetic and Electronic Systems. Abstract, 2006 1 page.
Drewing et al; First Evaluation of a Novel Tactile Display Exerting Shear Force via Lateral Displacement; ACM Transactions on Applied Perception; vol. 2; Apr. 2005; pp. 118-131.
Fritschi et al.; Intergration of Kinesthetic and Tactile Display—A Modular Design Concept; Max-Planck Institute for Biological Cybernetics; Germany; 6 pages; no date, 2006.
Hayward et al., Tactile Display Device Using Distributed Lateral Skin Stretch. Dept. of Electrical Engineering Center for Intelligent Machines. McGill University. 2000. 6 pages.
Kahol et al., Tactile Cueing Haptic Visualization. Center for Cognitive Ubiquitous Computing. Arizona State University, Tempe Arizona. 2005. 4 pages.
Kim et al; Hand-Writing Rehabilitation in the Haptic Virtual Environement; HAVE 2006—IEEE International Workshop on Haptic Audio Visual Environments and their Applications; Ottawa, Canada Nov. 4-5, 2006.
Lam et al.; A Haptic-Robotic Platform for Upper-Limb Reaching Stroke Therapy: Preliminary Design and Evaluation Results; Journal of NeuroEngineering and Rhabilitation; May 22, 2008; 13 pages.
Levesque et al., Experimental Evidence of Lateral Skin Strain During Tactile Exploration. Center for Intelligent Machines. Dept. of Electrical and Computer Engineering, McGill University. 2003 pp. 261-275.
MacLean; Haptics and the User Interface; www.cs.ubc.ca/~maclean/publics/ 27 pages, 2008.
Morris et al., A Robotic Walker That Provides Guidance. School of Computer Science, Carnegie Mellon University, Pittsburg PA. 2003, 6 pages.
Mullins et al.; Haptic Handwriting Aid for Training and Rehabilitation; 5 pages, Oct. 2005.
Phantom Premium 1.5/6DOF; 1.5 Highforce6DOF Haptic Devices; 2 pages, Jun. 22, 2009.
Phantom; Desktop Haptic Device; SensAble Technologies, Inc. 2008, 2 pages.
Rabin et al.; Haptic Stabilization of Posture: Changes in Arm Proprioceptiona and Cutaneous Feedback for Different Arm Orientations; The American Physiological Society; 1999; pp. 3541-3549.
Raisamo et al.; Haptic User Interfaces 2007. Power point presentation. 10 pages.
Rassmus-Grohn; Enabling Audio-Haptics; Certec, Lund; 2006; 126 pages.
Related Case: U.S. Appl. No. 12/699,494, filed Feb. 5, 2009; William R. Provancher.
Related Case: U.S. Appl. No. 12/402,067, filed Mar. 11, 2009; William R. Provancher.
Related Case: U.S. Appl. No. 13/041,169, filed Mar. 4, 2011; William R. Provancher.
Salada et al; Fingertip Haptics: A novel Direction in Haptic Display; Northwestern University, Dept. of Mechanical Engineering and Dept of Psychology; 2002; 10 pages.
Sallnas; Supporting Presence in Collaborative Environments by Haptic Force Feedback; ACM Transactions on Computer-Human Interaction; Dec. 2000; vol. 7, No. 4; pp. 461-476.
Sjostrom et al.; The Sense of Touch Provides New Computer Interaction Techniques for Disabled People; Sweden; 9 pages, 1998.
Sjostrom et al; The Sence of Touch Provides New Computer Interaction Techniques for Disable People; Technology and Disablity; 1999; pp. 45-52.
Steele et al.; Shared Control Between Humand and Machine: Using a Haptic Steering Wheel to Aid in Land Vehicle Guidance; University of Michigan; Ann Arbor MI; 2001; 5 pages.
Uros et al.; HIFE—Haptic Interface for Finger Exercise; IEE; Feb. 2006; vol. 11, No. 1; pp. 93-102.
U.S. Appl. No. 12/182,906, filed Jul. 30, 2008; William R. Provancher; office action issued Mar. 29, 2011.
Office Action for U.S. Appl. No. 13/041,169 mailed Dec. 2, 2014.

\* cited by examiner

FIG. 1A

Section B-B
FIG. 1B

FIG. 4

SHEAR TACTILE DISPLAY SYSTEMS FOR USE IN VEHICULAR DIRECTIONAL APPLICATIONS

PRIORITY CLAIM

This application claims priority of U.S. Provisional Patent Application Ser. No. 61/262,777, filed Nov. 19, 2009, which is hereby incorporated herein by reference in its entirety.

RELATED APPLICATIONS

This application is related to U.S. patent application Ser. No. 12/182,906, filed Jul. 30, 2008, and U.S. Provisional Patent Application Ser. No. 60/962,649, filed Jul. 30, 2007, each of which is hereby incorporated herein by reference.

BACKGROUND

The field of haptics is the science of interfacing with users via the sense of touch by applying forces, vibrations or motions to a user. Haptic devices are increasingly becoming used to provide sensory input to a user to provide information to the user: similar to the manner in which sights and sounds provide information to the user about a surrounding environment. As an example, one commonly available (albeit simplistic) haptic device is the game stick (or "joystick") controller sold by Nintendo under the trade name "Rumble Pak." This haptic device produces vibratory motion at various times during gameplay to provide the game player, through his or her sense of touch, with information relating to a scenario of the game: e.g., when he or she fires a weapon or receives damage in the game. Haptic devices are also recognized as an integral part of virtual reality systems, which attempt to simulate, through the application of forces to a participant, situations he or she "experiences" in the virtual environment.

While haptic devices have been produced for a variety of uses, many technological hurdles remain. For example, the difficulties of successfully adapting haptic informational systems for use with vehicular operating systems remain largely unaddressed by conventional systems.

SUMMARY OF THE INVENTION

In accordance with one embodiment, the invention provides a vehicle component capable of providing directional cues to a user of the vehicle. The vehicle component can be configured to be installed within a vehicle that is adapted to be ridden or controlled by a user. A tactile display system can be operably coupled to the vehicle or the vehicle component. The tactile display system can include a contact pad, operable to engage a target area of a user's skin; a restraining system, operable to restrain a portion of the user's skin distal from the target area of the skin; and an actuation system, operably coupled to one of: i) the contact pad and the ii) restraining system. The actuation system can be capable of moving the contact pad and the restraining system relative to one another to apply a shear force across the target area of the user's skin to thereby provide tactile information to the user.

In accordance with another aspect of the invention, a method for adapting a vehicle to allow the provision of directional cues to a user of the vehicle is provided, including: installing within, or coupling to, a component of the vehicle a tactile display system. The tactile display system can include: a contact pad, operable to engage a target area of a user's skin; a restraining system, operable to restrain a portion of the user's skin distal from the target area of the skin; and an actuation system, operably coupled to one of: i) the contact pad and the ii) restraining system. The actuation system can be capable of moving the contact pad and the restraining system relative to one another to apply a tangential displacement or shear force across the target area of the user's skin to thereby provide tactile information to the user. The method can further include coupling a control system to the actuation system, the control system being operable to cause movement of the contact pad relative to the component of the vehicle in order to provide tactile information to the user while the user operates the vehicle.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention.

In describing and claiming the present invention, the following terminology will be used.

As used herein, relative terms, such as "upper," "lower," "upwardly," "downwardly," etc., are used to refer to various components of the systems discussed herein, and related structures with which the present systems can be utilized, as those terms would be readily understood by one of ordinary skill in the relevant art. It is to be understood that such terms in no way limit the present invention but are used to aid in describing the components of the present systems, and related structures generally, in the most straightforward manner.

As used herein, the term "substantially" refers to the complete or nearly complete extent or degree of an action, characteristic, property, state, structure, item, or result. As an arbitrary example, when an object or group of objects is/are referred to as being "substantially" symmetrical, it is to be understood that the object or objects are either completely symmetrical or are nearly completely symmetrical. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As an arbitrary example, an opening that is "substantially free of" material would either completely lack material, or so nearly completely lack material that the effect would be the same as if it completely lacked material. In other words, an opening that is "substantially free of" material may still actually contain some such material as long as there is no measurable effect as a result thereof.

As used herein, the term "vehicle" is intended to encompass a broad array of devices that provide or assist humans in mobility. Examples of vehicles include, without limitation, automobiles, watercraft, aircraft, ambulatory assist devices (e.g., wheelchairs, walkers, personal motorized carts, etc.), and the like.

As used herein, the term "contact pad" is intended to encompass a variety of pads or surfaces suitable to apply a tangential displacement or shear force to a user's skin in order to provide tactile information to the user. The size, shape, roughness, etc., of the contact pad can vary from one embodiment to another. In one aspect of the invention, an inner surface of two concentric shells constitutes the contact pad, as the inner concentric shell moves relative to the outer concentric shell to thereby provide tactile information to a user via an opening in the other shell. In another aspect of the invention, a moving strip disposed on or in the steering wheel rim constitutes the contact pad, as the strip moves relative to the non-moving portion of the rim to thereby provide tactile information to a user. Other non-limiting examples of contact pads include rubber coated blocks, sand paper, friction or grip tape, and/or small rounded tactors such as those used in an IBM™ TrackPoint™ interface.

In its broadest sense, a contact pad is simply the moving part of a device that comes into contact with a user's skin in order to provide tactile information to the user. In some embodiments, the "contact pad" is simply an area of a larger surface with which a user's finger comes into contact (e.g., the "contact pad" may be indistinguishable from surrounding portions of the contact surface, but for the presence of a user's finger on or over the contact pad). Sometimes the terms "contact pad" and "tactor" are used interchangeably herein.

It is noted that exemplary components of the various embodiments of the invention are illustrated in the figures in a manner meant to most clearly describe the invention. In many cases, these components are shown schematically, and are likely not drawn to scale. Also, some components are shown only generically, with some necessary features omitted for the sake of clarity. For example, while various actuators are illustrated in the figures, none of the necessary wiring, control systems, power sources, etc., required to operate such components are shown. It is understood that one of ordinary skill in the art having possession of this disclosure would readily understand how such components can be configured to operate within the present invention.

Invention

The present invention expands upon the concepts presented in the above-referenced patent applications to the same inventor. The reader is directed to these applications for a more detailed description of the concepts of providing tactile information to a user via application of shear forces to the user's skin. The present disclosure will focus primarily on the more specific use of such concepts in providing tactile information to an operator of a vehicle. In some embodiments, tactile information is provided to an operator of a vehicle through the rim of a steering wheel of the vehicle. Examples of advantages of providing tactile information in such a manner include: the resulting ability to provide directional cues, augment driver awareness, or provide an intuitive manner of interacting with vehicle peripherals, such as sound systems.

In one aspect, skin stretch cues are provided in the circumferential direction on the rim of a steering wheel with a repeating cadence similar to a turn signal. These tactile cues can indicate to the driver that the driver should turn right or left, in a manner analogous to the way in which such information is currently communicated visually or audibly in connection with conventional in-car GPS systems. The present invention can eliminate or greatly reduce the need for audible instructions, advantageously reducing the cognitive load on a driver while he or she is driving by providing feedback in a more intuitive manner. For example, the designs described herein can provide cues that coordinate with directions from a GPS system. These cues can be provided to the fingertip or pads of the driver's finger on the backside, radially inward surface, and/or other surfaces of the rim of a steering wheel of a vehicle.

Tactile cues provided by this invention could also be used in combination with a vehicle lane/position monitoring system to indicate to a driver they are departing their lane unexpectedly and the cues could indicated the direction of steering input to correct their path. In a similar manner, the direction cues could indicate to a driver that the roadway will narrow to have fewer lanes, as is common in congested cities to maximize traffic flow into and out of cities in the morning and evening.

Devices in accordance with the present invention can include both sensor input along with tangential feedback and can be installed on the surface of the steering wheel rim in a variety of positions (e.g., in the 12 o'clock position, the 3 and/or 9 o'clock positions, etc.). In this manner, the driver can control a vehicle peripheral and receive tactile feedback that relates to such control (e.g., to scroll through radio channels, or "point" toward a vehicle positioned in a "blind spot" of the vehicle). This tactile I/O device on the front, rear or inside surface of the steering wheel can be accessed via the driver's thumb or finger, while not interfering with the driver's ability to firmly grip the steering wheel. The tactile I/O device's contact pad (or "tactor") that provides tactile input to the driver's finger or thumb can be recessed in a "finger-well" to: 1) keep it protected when it is not intended to be interacted with, and 2) to provide enhanced restraint for the driver's finger, which enhances the sensation experienced for a given distance of tangential motion applied by the device's contact pad.

In one aspect of the invention, the vehicle component that includes the tactile display can be operably coupled to an auxiliary device associated with the vehicle. The auxiliary device can include a variety of devices commonly associated with conventional vehicles, including, but not limited to, a sound system of the vehicle, a navigational system of the vehicle, a telecommunication system of the vehicle, and/or a position sensing system of the vehicle.

In this embodiment of the invention, the tactile display system can both receive input from the auxiliary device, and can provide commands to the auxiliary device. Thus, for example, if the tactile display system is being used to communicate with a sound system of the vehicle, the tactile display system can both receive information relating to the sound system (e.g., the current channel setting, the number of a track on a CD, etc.) and can provide control commands to the sound system (e.g., command the system to change channels, change tracks of a CD, change CDs, etc.).

In one embodiment of the invention, the tactile display system can provide tactile information to the user in a manner that is independent of force applied by the user to the vehicle component, and/or of force applied by the vehicle component to the user. This aspect of the system can be advantageous in that the tactile information is provided to the user without interfering with, or adding or detracting from, forces applied by the user to the vehicle component. For example, the user can turn a steering wheel of the vehicle while receiving information from the tactile display system without requiring that the system add to, or reduce, the torque being applied to the steering wheel by the user.

A variety of embodiments for implementing the invention are described herein and shown in the accompanying figures. In many of these embodiments, skin stretch cues are provided in the circumferential direction on the rim of a steering wheel with a repeating cadence similar to a turn signal. These tactile cues can be used to indicate a variety of information to a driver: e.g., that the driver should turn right or left, that the driver should be aware of a potentially dangerous situation, etc. These cues can also be varied by frequency or amplitude to indicate urgency or nearness of an upcoming turn.

Methods of actuation used in the present devices can include a wide variety of technologies. Piezoelectric actuators or electromagnetic actuators (e.g., motors, voice-coils, or solenoids) are two possibilities. Use of Shape Memory Alloy (SMA) actuators may be particularly attractive from a packaging standpoint. Pneumatic or hydraulic actuators can also be utilized since both are available in many vehicles. A variety of other actuators can also be substituted for those specifically disclosed herein.

Figure 1A:
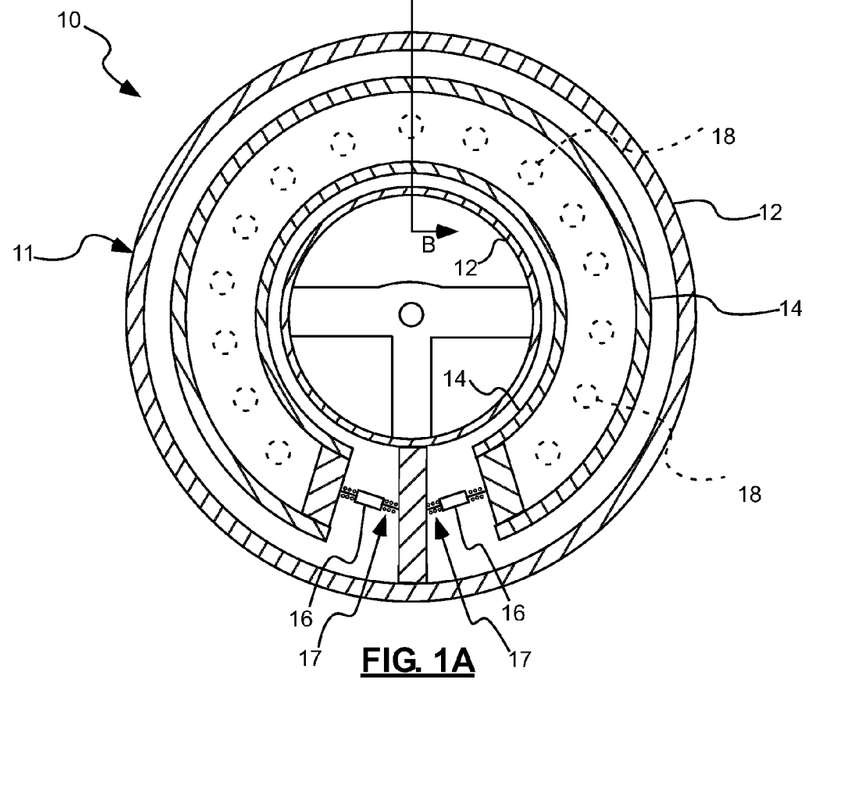
FIG. 1A illustrates an embodiment of the invention that utilizes concentric shells of a steering wheel rim to provide tactile information to a user of a vehicle with which the steering wheel is associated.
Figure 1B:
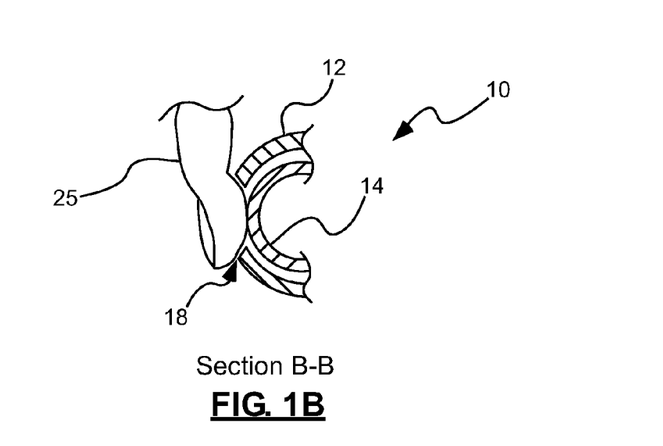
FIG. 1B illustrates a section of the system of FIG. 1A (taken along section B-B), showing a finger positioned in a finger well of the system of FIG. 1A.

In the embodiment illustrated in FIGS. 1A and 1B, the system 10 utilizes concentric members or shells that are rolled into the shape of a steering wheel rim 11. Shell 12 is the outer shell of the steering wheel that is grasped by a user of the vehicle during normal operation of the vehicle. An inner shell 14 can be moveable within the outer shell via actuators 16. The outer shell can include a number of access holes 18 through which the inner shell is visible (from the rear of the view shown in FIG. 1A) and tactilely accessible by a user of the vehicle. Thus, after a user positions his or her finger over or on one of the access holes 18, he or she will be able to feel relative movement between the outer shell 12 and inner shell 14.

The number and configuration of the access holes 18 can vary. A multitude of access holes are shown in FIG. 1A, spaced about a circumference of the steering wheel 11. In this manner, the user can gain access to the tactile information regardless of the position about the circumference that she places her hands. In other embodiments, only one or two access holes may be provided, to strategically position the holes in areas where it is desired (or most common) for the user of the vehicle to place his or her hands. As suggested by the access holes or orifices 18a, 18b of FIGS. 2 and 3, in some embodiments of the invention, the access holes can include inset structure that serves as a "finger well" that aids in immobilizing skin of the finger not being stretched by the contact pad. In this manner, the skin that is subject to the shear force applied by the contact pad can be better conditioned to interpret the sensation being applied by the contact pad.

The access holes or orifices 18a, 18b can positioned about the outer shell 12 of the steering wheel 11 in such as way as to be most efficiently integrated with the original design of the steering wheel of the vehicle. For example, many steering wheels include indentations, grooves, or protrusions that aid a user in grasping the steering wheel, or in properly positioning the user's hands in the best position about the circumference of the steering wheel. In these cases, the access holes, or finger wells, can be positioned so as to coincide with the "natural" position of the user's fingers on the steering wheel (for example, between "knuckles" already present on many steering wheels). The access holes can be located on the back, radially inward surface, and/or other surfaces of the steering wheel rim.

The access holes 18, 18a, etc., can vary in size and shape. In one aspect, the orifices are substantially round in shape and can include a diameter on the order of 12.5 mm. In other embodiments, the orifices can be made oblong in shape, to accommodate more of the length of the finger. Other variations in shape and size can also be realized.

The cross-section of the steering wheel shells are shown in FIGS. 1A and 1B as generally circular. However, they can be shaped as open C-channels or other shapes commonly used in steering wheels. The actuators 16 of the embodiment of FIGS. 1A and 1B can be common solenoids (one provided for each direction of motion). In other embodiments, however, the actuators can include, without limitation, motors, voice-coils, shape memory alloy, electro-active polymers, pneumatic actuators, hydraulics, etc.

The embodiment shown in FIGS. 1A and 1B uses solenoid actuators 16 in combination with compliant members 17 (e.g., coiled springs) to return the inner tube or shell to a center position after actuation in one direction or the other. This is done so that the system is then prepared to apply the next tactile skin stretch stimulus. This can eliminate or reduce the need for other sensors or more elaborate control. In some embodiments, an "inch-worm" style actuation system is utilized, where there is no return to center behavior: this can eliminate the need for external sensors and can be implemented via a "friction shoe" design in combination with actuation. Since the motion provided by an "inch-worm" style actuator is continuous and relative to the current position, there is no need to return to a "center position." This could also be advantageous as tangential motion is only communicated in one direction, and could be less ambiguous to a user. The device can also be actuated in other manners including, but not limited to, motors, voice-coils, shape memory alloy, electro-active polymers, pneumatic actuators, hydraulics, etc.

The embodiment illustrated in FIGS. 1A and 1B provides the advantage that actuation need be done at only one location, but can provide tactile feedback at a variety of locations around the perimeter of the steering wheel (i.e., numerous finger-wells can be located around the perimeter of the steering wheel, similar to finger grooves that are that are commonly found on most steering wheels). In other words, the various components of the actuation system (e.g., springs, actuators, etc.) need not be positioned near the location of the finger-well, as the actuated inner shell can move relative to a finger-well formed in nearly any location about the perimeter of the outer shell. Also, a number of finger-wells can be advantageously and easily formed in the outer shell to allow for a wide range of possible locations from which a user can choose, depending upon his or her driving style.

The geometry of the finger-well can be a simple chamfered hole (~12.5 mm diameter), or it can be configured as an elongated slot. The finger-well can also be used in combination with finger grooves that would run along the length of the finger 25. The finger-wells can be located such that the fingertip and/or fingerpads of the distal or middle segment of the finger would sit within the finger-well and make contact with the device's moving tactor or contact pad. The position of the finger-well can also be adjusted about the outer shell relative to the "front" of the steering wheel (e.g., the portion of the steering wheel that faces the driver). For example, the finger well can be positioned so as to face a driver, positioned 180 degrees to the rear of the steering, or in any functional position therebetween (including along the innermost surface of the outer shell of the steering wheel).

While the embodiment depicted in FIG. 1 utilizes single actuators 16, or an actuator pair, to move all the tactors on the perimeter of a steering wheel rim, in many embodiments movement of each individual tactor can be provided by a dedicated actuation system. For example, in the embodiments illustrated in FIGS. 2 and 3, one actuator assembly per tactor (or contact pad) is utilized: in this manner, many sets can be used to place many coordinated moving tactors or contact pads around the perimeter of a steering wheel. The individual tactors illustrated in FIGS. 2 and 3 can be wired in series or parallel and actuated simultaneously: or they can be wired separately and individually controlled to, for example, be operated in procession or only operated if a finger is in contact with that location's tactor.

One of ordinary skill in the art, having possession of this disclosure, will readily appreciate that choice of actuator used, and the placement and orientation of various actuators can be varied to provide optimal results with the most efficient use of components. The examples provided in FIG. 2 and FIG. 3 are only two of many designs that can be realized.

Figure 2:
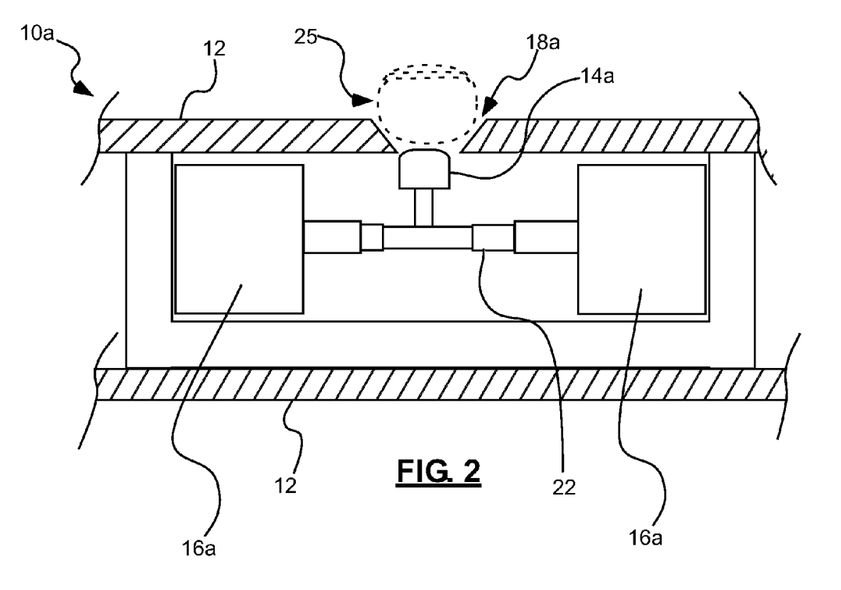
FIG. 2 illustrates an embodiment of the invention that includes an actuating system controlling a single contact pad within a steering wheel to provide tactile information to a user of a vehicle with which the steering wheel is associated.

FIG. 2 illustrates an embodiment of the invention in which a single tactor is actuated inside of a steering wheel shell 12. In this embodiment, a pair of voice-coil actuators 16a are arranged on opposing ends of a telescoping rod 22. The single tactor can be attached to the telescoping rod and can thus be accessible via finger-well or orifice 18a in the outer shell 12 of the steering wheel. This design will fit inside a variety of hollow or open structures used to form the rim of a steering wheel. A number of these actuator assemblies can be placed inside of the rim of the steering wheel about its entire perimeter.

Figure 3:
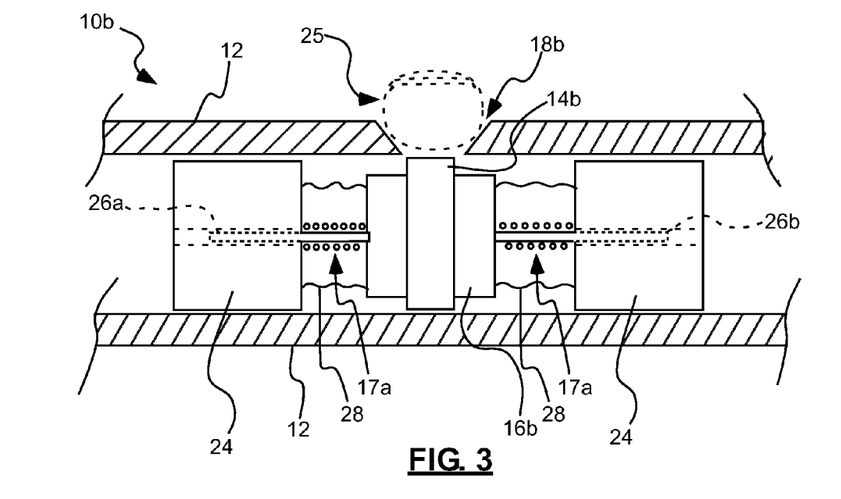
FIG. 3 illustrates an embodiment of the invention in which a centered "push-pull" solenoid control system is used to actuate a contact pad within a steering wheel to provide tactile information to a user of a vehicle with which the steering wheel is associated.

FIG. 3 illustrates an embodiment of the invention that utilizes a pair of solenoids 16b configured such that it can both push and pull a contact pad or tactor 14b. In this aspect, the tactor is created by wrapping the solenoids with relatively high friction material, such as friction tape. The through-rods 26a, 26b of the solenoids can be supported on the ends by support blocks 24. The solenoids themselves can be wrapped with the friction tape to form the moving tactor 14b. Similar to the embodiment shown in FIG. 2, many of these actuator assemblies can be arranged about the perimeter of the steering wheel.

In the embodiments of FIGS. 2 and 3, as well as other embodiments (not shown), a variety of arrangements of actuators, biasing elements and dampening elements can be configured in a variety of orientations. In the example shown in FIG. 3, springs 17a can be utilized to provide a restoring force to return the tactor 14b to a center position. The springs can be oriented between the tactor 14b and the support blocks 24, or can be positioned on outer ends of the through-rods 26a, 26b, if desired. Also, a damping material 28 can be utilized to provide some damping on the passive return motion of the tactor to center position. The damping material can also aid in providing the restoring force to augment the springs 17 (alternately, no springs can be used, and the damping material can serve both purposes). One non-limiting example of a suitable damping material includes polyurethane foam. In the example shown in FIG. 3, the damping material 28 can include a hollow interior section to accommodate the springs 17a.

While the embodiment illustrated in FIG. 3 includes two paired "back-to-back" solenoids, other embodiments utilize actuators placed on opposing sides of the tactor, one used to actuate the tactor in one direction, and one used to actuate the tactor in an opposing direction.

The various embodiments discussed above can be incorporated into an existing steering wheel, or modified steering wheels can be utilized. For example, the tubular structure of the steering wheel can be formed from two pieces, where one side is just greater than one-half the circumference, such that the actuators can be "snap fit" into that half of the tube. A split tube or open c-channel in which the tactor assembly would be packaged can be over-wrapped with leather, etc. to form the final steering wheel surface.

Figure 4:
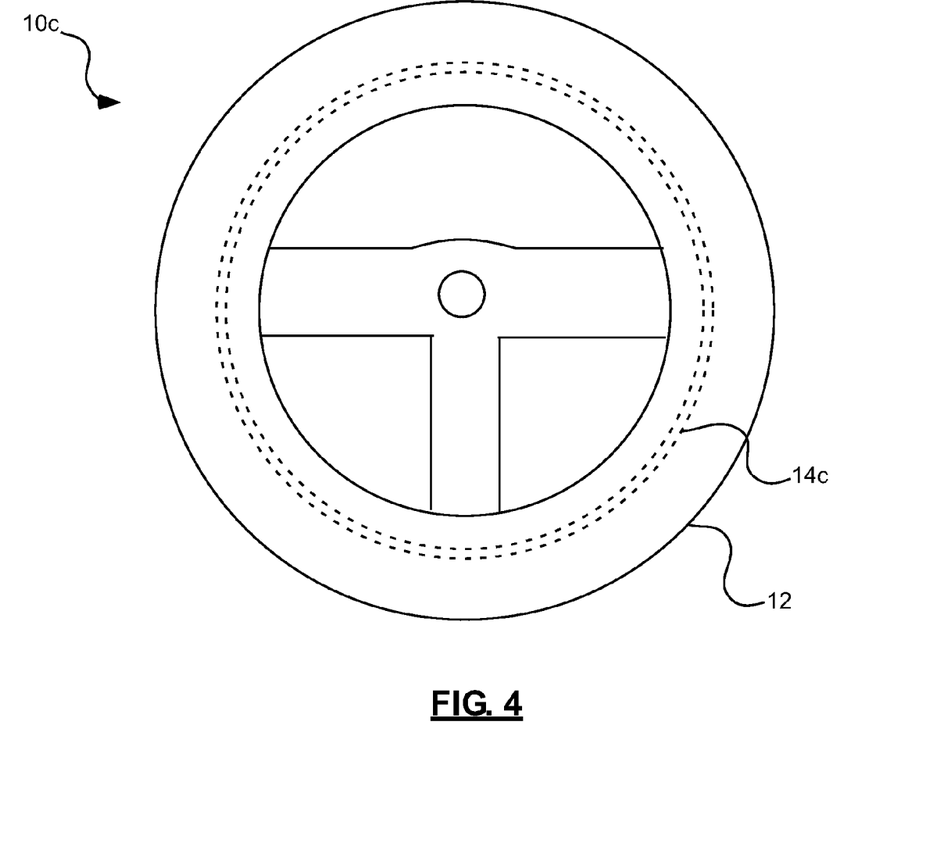
FIG. 4 illustrates an embodiment of the invention in which a substantially continuous strip is utilized as the contact pad on a steering wheel rim to provide tactile information around a portion of the steering wheel to a user of a vehicle with which the steering wheel is associated.

The design shown in FIG. 4 uses a substantially continuous strip (shown in the "back" of the steering wheel at 14c) as the contact pad that can be flush or recessed from the steering wheel rim surface 12. Note that rather than a continuous strip, several discrete strips may also be used. In this case, the non-moving portion of the steering wheel rim can act as the finger restraint rather than using a "finger-well" and the strip can serve as the contact pad 14c. This moving strip can be placed on the front or back surface of the steering wheel rim. It may be on the surface that faces radially inward or radially outward on the rim, or in other locations on the steering wheel rim. The moving strip(s) may also be placed in combinations of these locations. Actuation can be provided with a single actuator if a single or multiple moving strips are used and if multiple strips are used multiple actuators may be used in order to move the strips in unison or separately.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by any claims associated with this or related applications.

What is claimed is:

1. A system capable of providing directional cues to a user of a vehicle, comprising:
   a vehicle component, configured to be installed within a vehicle that is adapted to be controlled by a user, the vehicle component including a steering wheel; and
   a tactile display system, operably coupled to the vehicle component, the tactile display system including:
      one or more contact pads, at least one of the one or more contact pads operable to engage a plurality of target areas of a user's skin;
      a restraining system having one or more apertures therein, operable to restrain a portion of the user's skin distal from the plurality of target areas of the skin, the steering wheel including an outer shell having the one or more apertures formed therein, the one or more contact pads coupled to, or formed integrally with, an inner shell, moveable relative to the outer shell such that movement of the inner shell relative to the outer shell provides tactile information to a user's digit positioned over or in one or more of the apertures; and an actuation system, operably coupled to one of: i) the one or more contact pads and the ii) restraining system; the actuation system being capable of moving the one or more contact pads and the restraining system relative to one another, the one or more contact pads being positioned inside the restraining system and a surface of the one or more contact pads being larger than the one or more apertures, to apply a shear force across the plurality of target areas of the user's skin to thereby provide tactile information to the user.

2. The system of claim 1, wherein the restraining system is coupled to or formed integrally with the steering wheel.

3. The system of claim 2, wherein the restraining system comprises a finger well, positioned so as to be accessible by the user while grasping the steering wheel during operation of the vehicle.

4. The system of claim 1, wherein the actuation system provides relative movement between the inner shell and the outer shell in a location remote from the one or more apertures.

5. The system of claim 2, wherein substantially all components of the actuation system and the one or more contact pads are contained within or below an outer shell of the steering wheel.

6. The system of claim 1, wherein the vehicle component is operably coupleable to an auxiliary device associated with the vehicle, the auxiliary device including at least one of: a sound system of the vehicle, a navigational system of the vehicle, a telecommunication system of the vehicle, and a position sensing system of the vehicle.

7. A method for adapting a vehicle to allow the provision of directional cues to a user of the vehicle, comprising:

installing within, or coupling to, a component of the vehicle a tactile display system, the component of the vehicle includes a steering control that includes a steering wheel, the tactile display system including:

one or more contact pads, at least one of the one or more contact pads operable to engage a plurality of target areas of a user's skin;

a restraining system having a surface, the surface operable to restrain a portion of the user's skin distal from the plurality of target areas of the skin and having one or more apertures therethrough, the one or more apertures being configured to allow the plurality of target areas of the user's skin to be positioned therethrough and engage the one or more contact pads, the steering wheel including an outer shell having the one or more apertures formed therein, the one or more contact pads coupled to, or formed integrally with, an inner shell, moveable relative to the outer shell such that movement of the inner shell relative to the outer shell provides tactile information to a user's digit positioned over or in one or more of the apertures; and an actuation system, operably coupled to one of: i) the one or more contact pads and the ii) restraining system; the actuation system being capable of applying a lateral force to the one or more contact pads and the restraining system relative to one another to apply a shear force across the plurality of target areas of the user's skin to thereby provide tactile information to the user, wherein at least a portion of a surface of the one or more contact pads translates parallel to at least a portion of a surface of the restraining system;

coupling a control system to the actuation system, the control system being operable to cause movement of the one or more contact pads relative to the component of the vehicle in order to provide tactile information to the user while the user operates the vehicle.

8. The method of claim 7, wherein the tactile display system is coupled to the steering control.

9. The method of claim 8, wherein the restraining system is coupled to or formed integrally with the steering wheel.

10. The method of claim 9, wherein the restraining system comprises a finger well, positioned so as to be accessible by the user while grasping the steering wheel during normal operation of the vehicle.

11. The method of claim 9, wherein the actuation system is disposed at least partially within or at least partially beneath an outer shell of the steering wheel.

12. The system of claim 7, wherein the actuation system provides relative movement between the inner shell and the outer shell in a location remote from the one or more apertures.

13. The method of claim 9, wherein substantially all components of the actuation system and the one or more contact pads are contained within or below an outer shell of the steering wheel.

14. The method of claim 7, wherein the vehicle component is operably coupleable to an auxiliary device associated with the vehicle, the auxiliary device including at least one of: a sound system of the vehicle, a navigational system of the vehicle, a telecommunication system of the vehicle, and/or a position sensing system of the vehicle.

15. The system of claim 1, wherein the one or more contact pads are configured to move circumferentially about the vehicle component.

16. The system of claim 1, wherein at least two of the one or more contact pads share a tactor and are configured to communicate the same tactile information to the plurality of target areas simultaneously.

17. The system of claim 1, wherein the one or more contact pads comprises a substantially continuous strip extending circumferentially about the vehicle component.

18. The system of claim 1, wherein the actuation system is capable of moving the one or more contact pads and the restraining system relative to one another to apply a shear force across the plurality of target areas of the user's skin in a coordinated fashion to thereby provide tactile information to the user.

* * * * *